United States Patent
Huang et al.

(10) Patent No.: US 8,420,198 B2
(45) Date of Patent: Apr. 16, 2013

(54) OPTICAL RECORDING MEDIA

(75) Inventors: Yi-Kai Huang, Yilan County (TW); Kun-Long Li, Taipei County (TW); Yung-Hui Hung, Taipei County (TW); Cheng-Pi Lee, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 251 days.

(21) Appl. No.: 12/794,789

(22) Filed: Jun. 7, 2010

(65) Prior Publication Data

US 2011/0236618 A1 Sep. 29, 2011

(30) Foreign Application Priority Data

Mar. 23, 2010 (TW) ................ 99108557 A (51) Int. Cl.
*B32B 3/02* (2006.01)
(52) U.S. Cl.
USPC ....... 428/64.1; 428/64.4; 428/64.5; 428/64.6; 430/270.13
(58) Field of Classification Search ................ 428/64.4; 430/270.13
See application file for complete search history.

(56) References Cited

U.S. PATENT DOCUMENTS 7,063,876 B2 * 6/2006 Nishihara et al. ............ 428/64.1

FOREIGN PATENT DOCUMENTS

JP 2009-037722 2/2009

OTHER PUBLICATIONS

"Office Action of Japan Counterpart Application", issued on Mar. 27, 2012, p. 1-p. 3.

* cited by examiner

*Primary Examiner* — Elizabeth Mulvaney
(74) *Attorney, Agent, or Firm* — C. G. Mersereau; Nikolai & Mersereau, P.A.

(57) ABSTRACT

An optical recording media includes a substrate, a cap layer opposite to the substrate, at least one first stacked recording structure, at least one second stacked recording structure, and a space layer. The first stacked recording structure including a first recording layer disposed between the substrate and the cap layer and a reflective layer disposed between the substrate and the first recording layer is disposed between the substrate and the cap layer. The second stacked recording structure including a second recording layer disposed between the substrate and the cap layer and an $Nb_2O_5$ interface layer disposed between the substrate and the second recording layer is disposed between the substrate and the cap layer. The spacer layer is disposed between the first and second stacked recording structures, the first stacked recording structures, and the second stacked recording structures. One of the first stacked recording structures is disposed directly on the substrate.

18 Claims, 6 Drawing Sheets

OPTICAL RECORDING MEDIA

CROSS-REFERENCE TO RELATED APPLICATION

This application claims the priority benefit of Taiwan application serial no. 99108557, filed on Mar. 23, 2010. The entirety of the above-mentioned patent application is hereby incorporated by reference herein and made a part of specification.

BACKGROUND OF THE INVENTION

1. Field of the Invention

The invention is related to an optical recording media, and in particular to an optical recording media in which a reflective layer and a dielectric layer adjacent to the reflective layer are replaced by a niobium oxide ($Nb_2O_5$) interface layer.

2. Description of Related Art

Since optical recording media (commonly called optical disks) have advantages such as large storage capacity, ease of preservation, long life spans, low costs, and that data stored therein are not easily damaged, optical recording media have gradually replaced conventional magnetic recording media and have become an indispensable type of media in everyday lives of modern people.

An optical recording media has one or more recording layers, which mainly store data by being burned by a laser having a specific burning power, so that local micro-structural changes occur in the recording layers, thereby causing a difference in reflective indexes between a burned region and an unburned region. Utilizing the difference in reflective indexes, the data stored in the optical recording media are read by using a laser having a specific power.

Figure 1:
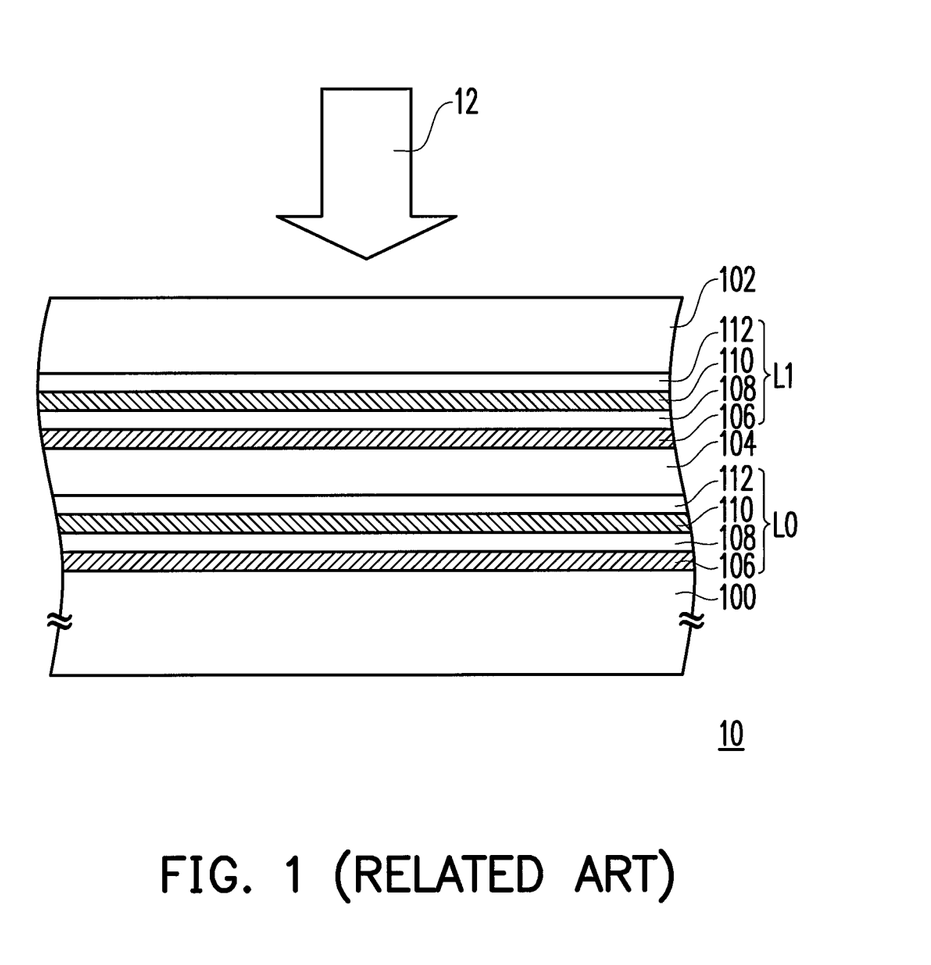
FIG. 1 is a schematic cross-sectional view of a conventional optical recording media.

FIG. 1 is a schematic cross-sectional view of a conventional optical recording media. Referring to FIG. 1, an optical recording media 10 has two stacked recording structures. The optical recording media 10 includes a substrate 100, a cap layer 102, a stacked recording structure L0, a stacked recording structure L1, and a space layer 104. The stacked recording structure L0 and the stacked recording structure L1 have the same structure, and each includes a reflective layer 106, a lower dielectric layer 108, a recording layer 110, and an upper dielectric layer 112 which are sequentially stacked. A laser beam 12 is incident to the optical recording media 10, so as to burn or to read the recording layer 110.

SUMMARY OF THE INVENTION

The invention provides an optical recording media which has a simpler structure.

The optical recording media of the invention includes a substrate, a cap layer, at least one first stacked recording structure, at least one second stacked recording structure, and a space layer. The cap layer is disposed opposite to the substrate. The first stacked recording structure is disposed between the substrate and the cap layer. The first stacked recording structure includes a first recording layer which is disposed between the substrate and the cap layer and a reflective layer which is disposed between the substrate and the first recording layer. The second stacked recording structure is disposed between the substrate and the cap layer. The second stacked recording structure includes a second recording layer which is disposed between the substrate and the cap layer and an $Nb_2O_5$ interface layer which is disposed between the substrate and the second recording layer. The space layer is disposed between the first stacked recording structures and the second stacked recording structures, between the first stacked recording structures which are adjacent to each other, and between the second stacked recording structures which are adjacent to each other. One of the at least one stacked recording structure is directly disposed on the substrate.

In the optical recording media according to an embodiment of the invention, the thickness of the $Nb_2O_5$ interface layer is from 1 nanometer (nm) to 300 nm.

In the optical recording media according to an embodiment of the invention, the material of the substrate is, for example, polycarbonate resin, polymethyl methacrylate, polystyrene resin, polyethylene resin, or polypropylene resin.

In the optical recording media according to an embodiment of the invention, the material of the cap layer is, for example, photo-curing resin.

In the optical recording media according to an embodiment of the invention, the material of the space layer is, for example, photo-curing resin.

In the optical recording media according to an embodiment of the invention, the material of the first recording layer is, for example, tellurium, palladium, germanium, indium, silver, antimony, copper, a silicon mixture, or alloys thereof.

In the optical recording media according to an embodiment of the invention, the material of the reflective layer is, for example, gold, silver, molybdenum, aluminum, titanium, tantalum, neodymium, bismuth, or alloys thereof.

In the optical recording media according to an embodiment of the invention, a dielectric layer disposed between the first recording layer and the reflective layer is further included.

In the optical recording media according to an embodiment of the invention, the material of the dielectric layer is, for example, zinc sulfide-silicon oxide, silicon nitride, germanium nitride, or silicon carbide.

In the optical recording media according to an embodiment of the invention, a dielectric layer disposed between the first recording layer and the cap layer is further included.

In the optical recording media according to an embodiment of the invention, a buffer layer disposed between the dielectric layer and the cap layer is further included.

In the optical recording media according to an embodiment of the invention, the material of the buffer layer is, for example, silicon oxynitride.

In the optical recording media according to an embodiment of the invention, the material of the second recording layer is, for example, tellurium, palladium, germanium, indium, silver, antimony, copper, a silicon mixture, or alloys thereof.

In the optical recording media according to an embodiment of the invention, a dielectric layer disposed between the second recording layer and the cap layer is further included.

In light of the above, by using the $Nb_2O_5$ interface layer which has high stability and a high refractive index to replace a reflective layer and a dielectric layer adjacent to the reflective layer, the structure of the optical recording media of the invention is simplified, and the thickness of the optical recording media is reduced.

In order to make the aforementioned and other objects, features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 2:
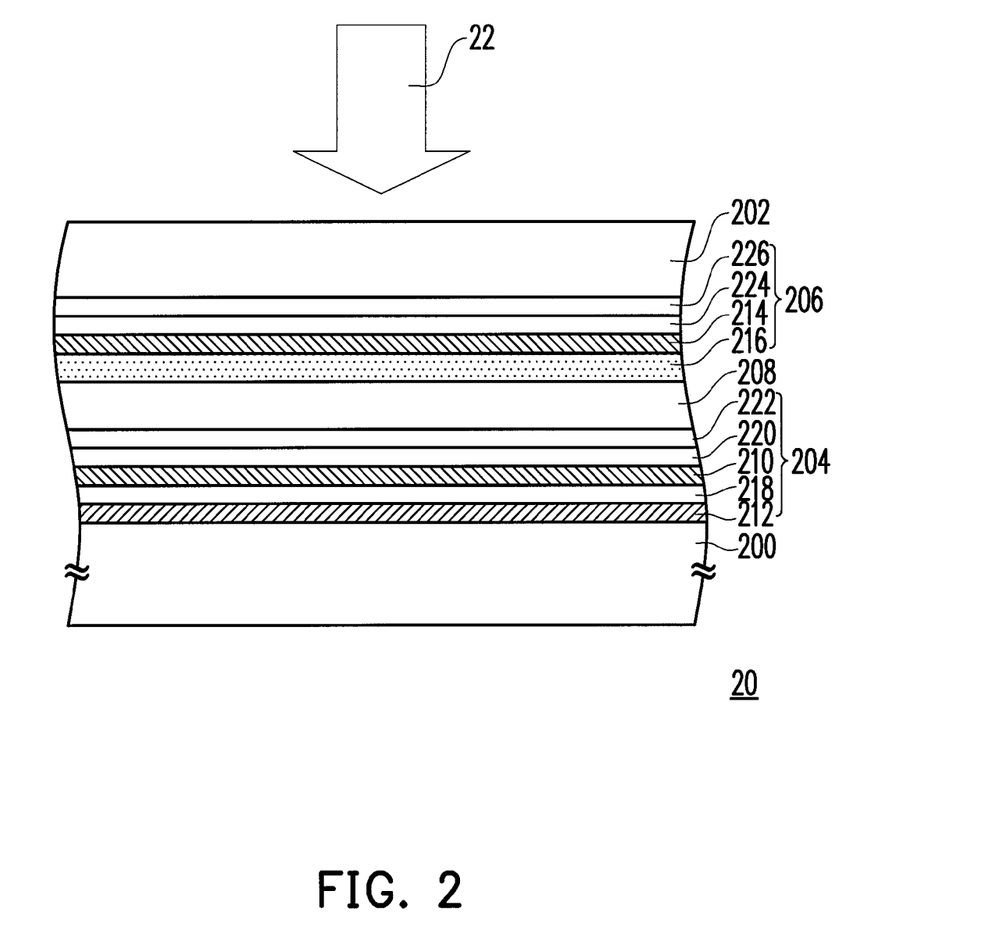
FIG. 2 is a schematic cross-sectional view of an optical recording media according to an embodiment of the invention.

FIG. 2 is a schematic cross-sectional view of an optical recording media according to an embodiment of the invention. Referring to FIG. 2, an optical recording media 20 includes a substrate 200, a cap layer 202, a stacked recording structure 204, a stacked recording structure 206, and a space layer 208. The substrate 200 is a transparent substrate which provides the optical recording media 20 with adequate mechanical strength, and the material thereof is, for example, polycarbonate resin, polymethyl methacrylate, polystyrene resin, polyethylene resin, or polypropylene resin. The thickness of the substrate 200 is, for example, from 1.0 millimeter (mm) to 1.2 mm. Grooves and lands are etched on the substrate 200 in advance. When the data is written or read, these grooves and lands function as laser guiding tracks and for recording data positions. The cap layer 202 is disposed opposite to the substrate 200. The material of the cap layer 202 is, for example, photo-curing resin. The thickness of the substrate 202 is, for example, from 90 micrometers (μm) to 110 μm. The cap layer 202 is used to maintain the stability of the film layers of the optical recording media 20, so as to prevent each of the film layers from being scratched, deteriorating due to humidity, or oxidized while exposed in the air.

The stacked recording structure 204 is disposed between the substrate 200 and the cap layer 202. The stacked recording structure 204 includes a recording layer 210 which is disposed between the substrate 200 and the cap layer 202 and a reflective layer 212 which is disposed between the substrate 200 and the recording layer 210. The material of the recording layer 210 is, for example, tellurium, palladium, germanium, indium, silver, antimony, copper, a silicon mixture, or alloys thereof. The thickness of the recording layer 210 is, for example, from 3 nm to 50 nm. The material of the reflective layer 212 is, for example, gold, silver, molybdenum, aluminum, titanium, tantalum, neodymium, bismuth, or alloys thereof. The thickness of the reflective layer 212 is, for example, from 5 nm to 300 nm. The stacked recording structure 206 is disposed between the stacked recording structure 204 and the cap layer 202. The stacked recording structure 206 includes a recording layer 214 which is disposed between the stacked recording structure 204 and the cap layer 202 and an $Nb_2O_5$ interface layer 216 which is disposed between the stacked recording structure 204 and the recording layer 214. The material and thickness of the recording layer 214 are the same as the material and thickness of the recording layer 210. The thickness of the $Nb_2O_5$ interface layer 216 is, for example, from 1 nm to 300 nm. A space layer 208 is disposed between the stacked recording structure 204 and the stacked recording structure 206, so as to adhere to and separate the stacked recording structure 204 and the stacked recording structure 206. The material of the space layer 208 is, for example, photo-curing resin. The thickness of the space layer 208 is, for example, from 20 μm to 30 μm. The $Nb_2O_5$ interface layer 216 is a film layer which has high stability and a high reflective index, and is capable of effectively reflecting a laser 22 of various wavelengths, so that micro-structural changes are generated in the recording layer 214. In addition, the $Nb_2O_5$ interface layer 216 also has a function of protecting the recording layer 214. Hence, the $Nb_2O_5$ interface layer 216 is capable of replacing a reflective layer and a dielectric layer adjacent to the reflective layer in a conventional optical recording media, so that the structure of the optical recording media 20 is simpler, thereby reducing the thickness of the optical recording media 20.

In addition, according to the present embodiment, a dielectric layer 218 is disposed between the recording layer 210 and the reflective layer 212, a dielectric layer 220 is disposed between the recording layer 210 and the space layer 208, a buffer layer 222 is disposed between the dielectric layer 220 and the space layer 208, a dielectric layer 224 is disposed between the recording layer 214 and the cap layer 202, and a buffer layer 226 is disposed between the dielectric layer 224 and the cap layer 202. The materials of the dielectric layers 218, 220, and 224 are, for example, zinc sulfide-silicon oxide, silicon nitride, germanium nitride, or silicon carbide, and the thicknesses thereof are, for example, from 1 nm to 300 nm. According to another embodiment, each of the dielectric layers 218, 220, and 224 may be a composite dielectric layer formed of the above materials. The materials of the buffer layers 222 and 226 are, for example, silicon oxynitride, and the thicknesses thereof are, for example, from 1 nm to 50 nm. According to another embodiment, the dielectric layers 218, 220, and 224 and the buffer layers 222 and 226 may be optionally disposed according to actual requirements.

It should be particularly noted that according to the present embodiment, the optical recording media only includes one stacked recording structure which includes the reflective layer and one stacked recording structure which includes the $Nb_2O_5$ interface layer. However, according to another embodiment, the optical recording media may include a plurality of stacked recording structures which include reflective layers and a plurality of stacked recording structures which include $Nb_2O_5$ interface layers, and one of the stacked recording structures which include the reflective layers is directly disposed on the substrate, and the other stacked recording structures which include the reflective layers and the stacked recording structures which include the $Nb_2O_5$ interface layers may be disposed according to actual requirements.

Figure 3:
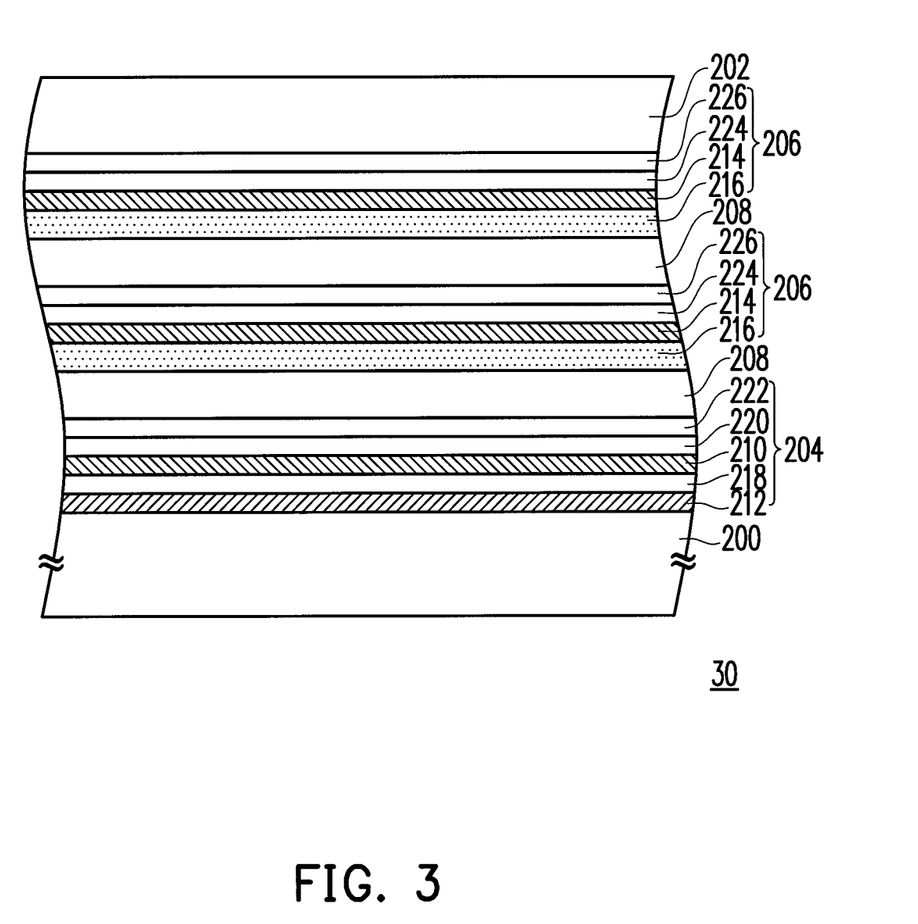
FIG. 3 is a schematic cross-sectional view of an optical recording media according to another embodiment of the invention.

FIG. 3 is a schematic cross-sectional view of an optical recording media according to another embodiment of the invention. In FIG. 3, the same reference numerals as those in FIG. 2 represent the same elements and are not repeatedly described. Referring to FIG. 3, an optical recording media 30 includes one stacked recording structure 204 which includes the reflective layer 212 and includes two stacked recording structures 206 which include the $Nb_2O_5$ interface layers 216. The stacked recording structure 204 is directly disposed on the substrate 200, and the two stacked recording structures 206 are sequentially disposed on the stacked recording structure 204. The space layers 208 are disposed between two stacked recording structures 206 and between the stacked recording structure 204 and the stacked recording structures 206.

Figure 4:
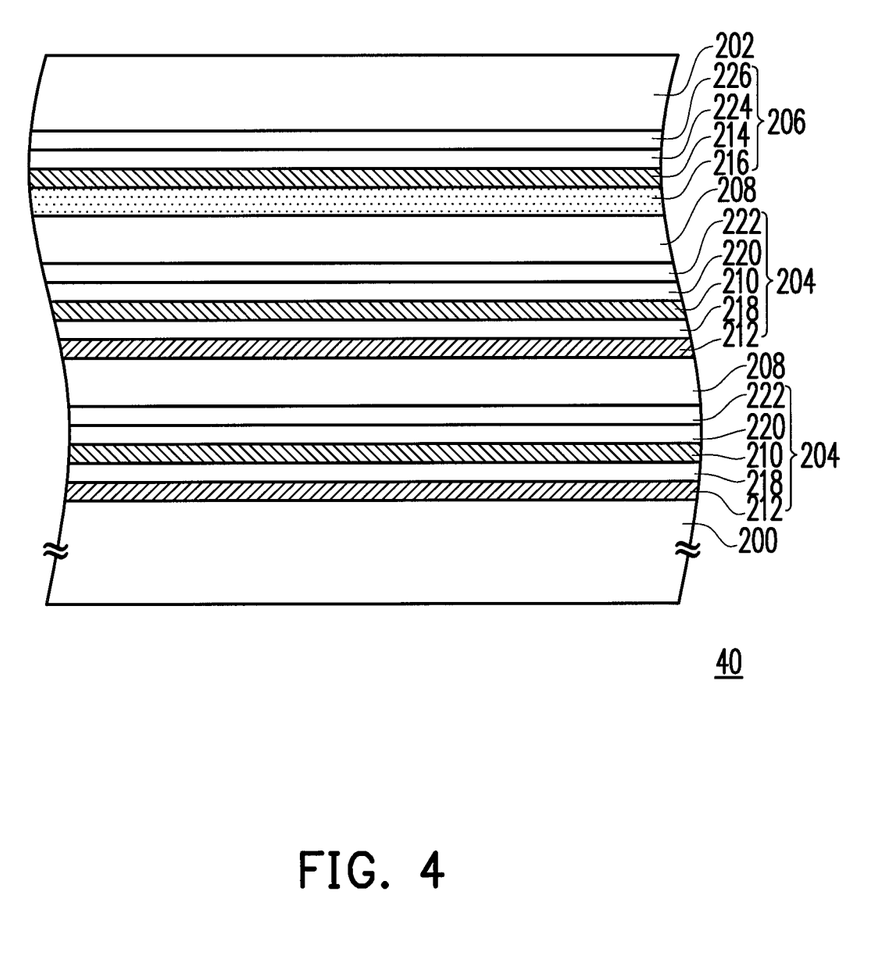
FIG. 4 is a schematic cross-sectional view of an optical recording media according to still another embodiment of the invention.

FIG. 4 is a schematic cross-sectional view of an optical recording media according to still another embodiment of the invention. In FIG. 4, the same reference numerals as those in FIG. 2 represent the same elements and are not repeatedly described. Referring to FIG. 4, an optical recording media 40 includes two stacked recording structures 204 which include the reflective layers 212 and includes one stacked recording structure 206 which includes the $Nb_2O_5$ interface layer 216, wherein one of the stacked recording structures 204 is directly disposed on the substrate 200, and the space layers 208 are disposed between two stacked recording structures 204 and between one of the stacked recording structures 204 and the stacked recording structure 206.

The following illustrates the optical recording media of the invention by using an experimental embodiment.

Experimental Embodiment

First, a substrate which has grooves and lands etched thereon is provided. The track gauge is 0.32 µm, and the thickness thereof is 1.1 mm. By a method of magnetically controlled sputtering, a 100 nm-thick silver reflective layer, a 30 nm-thick zinc sulfide-silicon oxide dielectric layer, a 14 nm-thick recording layer which includes copper, silicon, and chromium, a 30 nm-thick zinc sulfide-silicon oxide dielectric layer, and a 10 nm-thick silicon oxynitride buffer layer are then sequentially plated on the substrate, so that a first stacked recording structure is formed. Next, a 25 µm-thick space layer is coated on the first stacked recording layer. Afterwards, a 20 nm-thick $Nb_2O_5$ interface layer, a 14 nm-thick recording layer which includes copper, silicon, and chromium, a 30 nm-thick zinc sulfide-silicon oxide dielectric layer, and a 10 nm-thick silicon oxynitride buffer layer are then sequentially plated on the space layer, so that a second stacked recording structure is formed. Then, a 0.1 mm-thick cap layer is coated on the silicon oxynitride buffer layer, so that fabrication of the optical recording media is complete.

According to the present experimental embodiment, the thicknesses of the sputtered film layers are observed by using an atomic force microscope (AFM) and E-ta Optik, and dynamic testing of the optical recording media is performed by a PULSTEC ODU-1000 dynamic testing instrument. In addition, the writing power is from 10 milliwatts (mW) to 22 mW, and the wavelength (λ) of the laser is 405 nm, the numerical aperture (NA) is 0.85, and the linear writing speed is 4.92 meter/second (m/s), 9.84 m/s, 19.68 m/s, or 29.52 m/s, so as to comply with the specifications of the 1×, 2×, 4×, and 6× recording speeds of a BLU-RAY writable disk.

Figure 5:
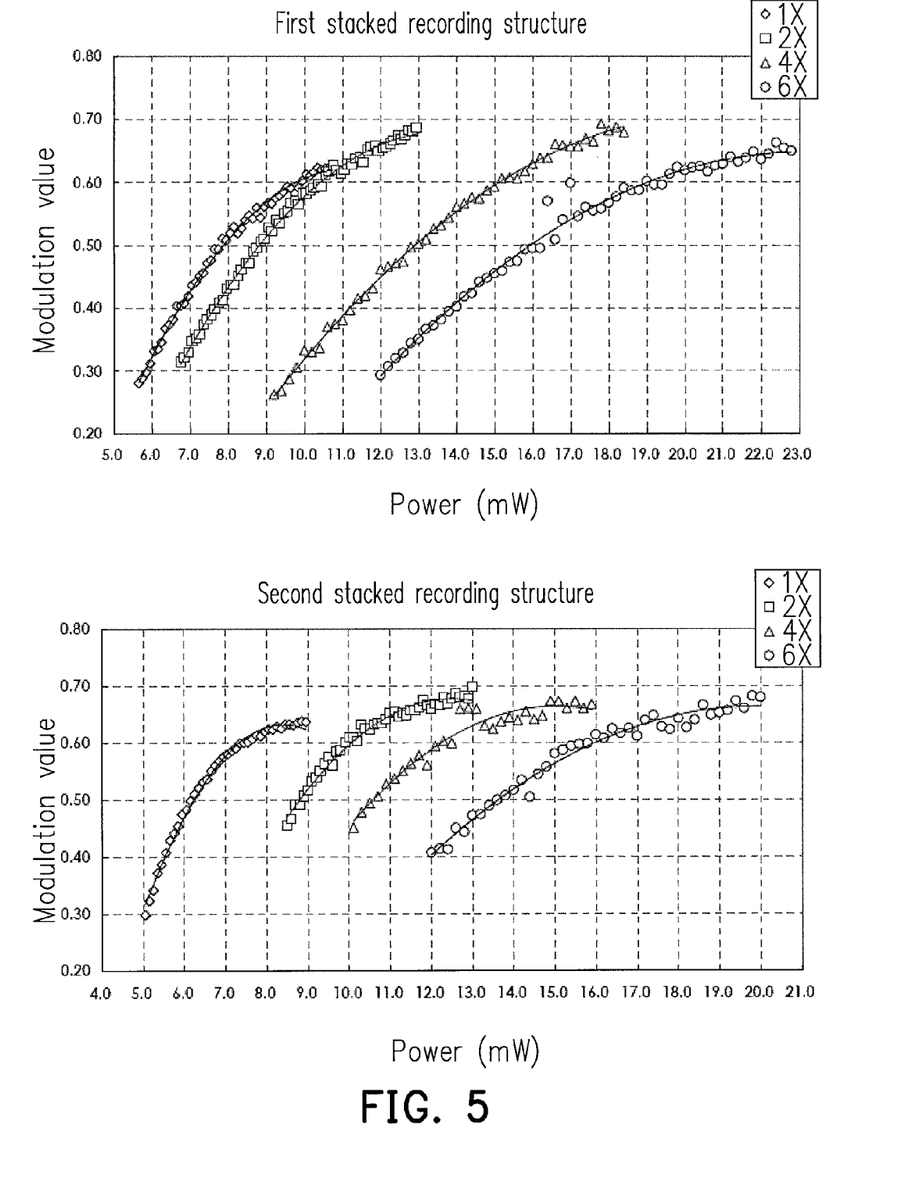
FIG. 5 shows a testing result of a relationship between a writing power and a modulation value of an optical recording media according to an experimental embodiment.

FIG. 5 shows a testing result of a relationship between a writing power and a modulation value of the optical recording media according to the present experimental embodiment. Referring to FIG. 5, at 1×, 2×, 4×, and 6× writing speeds, the modulation value increases with the writing power, and at different writing speeds and writing powers, the modulation value may exceed 0.4, thereby being compliant with the specifications of a BLU-RAY writable disk.

Figure 6:
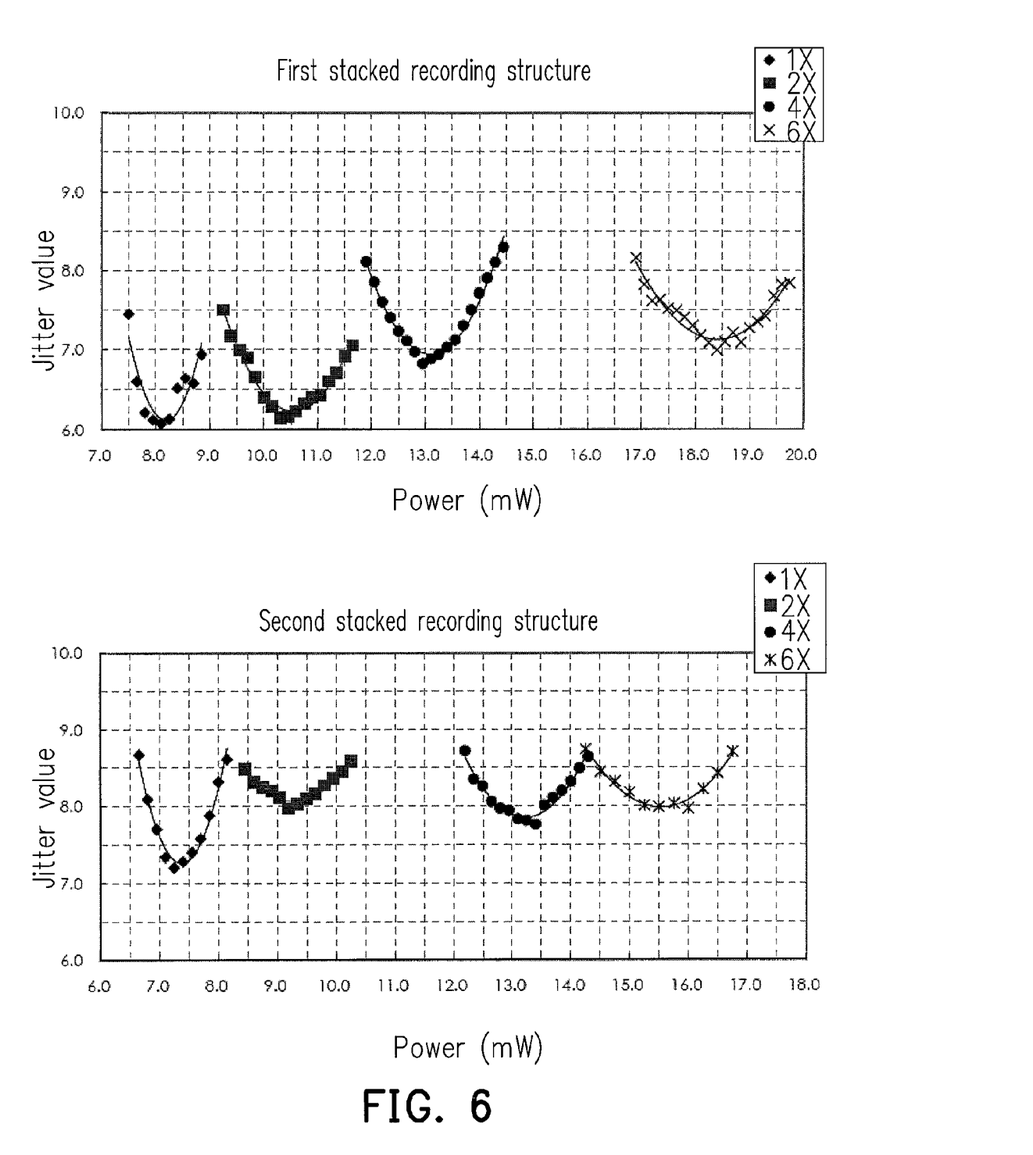
FIG. 6 shows a testing result of a relationship between a writing power and a jitter value of the optical recording media according to the experimental embodiment.

FIG. 6 shows a testing result of a relationship between a writing power and a jitter value of the optical recording media according to the present experimental embodiment. Referring to FIG. 6, at 1×, 2×, 4×, and 6× writing speeds, a level of electrical characteristic required for normal recording is obtainable in the second stacked film structure which includes the $Nb_2O_5$ interface layer, and the area between the jitter value and the writing power suitable for normal writing is wide. Additionally, the level of electrical characteristics in the first stacked film structure is also compliant with the requirements for normal recording and is not affected by the second stacked recording structure, thereby being compliant with the recording requirements of a BLU-RAY writable disk.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical recording media, comprising:
a substrate;
a cap layer, disposed opposite to the substrate;
at least one first stacked recording structure, disposed between the substrate and the cap layer, each of the first stacked recording structures comprising:
a first recording layer, disposed between the substrate and the cap layer; and
a reflective layer, disposed between the substrate and the first recording layer;
at least one second stacked recording structure, disposed between the substrate and the cap layer, each of the second stacked recording structures comprising:
a second recording layer, disposed between the substrate and the cap layer; and
a niobium oxide ($Nb_2O_5$) interface layer, disposed between the substrate and the second recording layer, wherein the $Nb_2O_5$ interface layer serves as a reflective/dielectric layer; and
a space layer, disposed between the first stacked recording structures and the second stacked recording structures, between the first stacked recording structures which are adjacent to each other, and between the second stacked recording structures which are adjacent to each other,
wherein one of the at least one stacked recording structure is directly disposed on the substrate.

2. The optical recording media as claimed in claim 1, wherein a thickness of the $Nb_2O_5$ interface layer is from 1 nm to 300 nm.

3. The optical recording media as claimed in claim 1, wherein a material of the substrate is polycarbonate resin, polymethyl methacrylate, polystyrene resin, polyethylene resin, or polypropylene resin.

4. The optical recording media as claimed in claim 1, wherein a material of the cap layer comprises photo-curing resin.

5. The optical recording media as claimed in claim 1, wherein a material of the space layer comprises photo-curing resin.

6. The optical recording media as claimed in claim 1, wherein a material of the first recording layer comprises tellurium, palladium, germanium, indium, silver, antimony, copper, a silicon mixture, or alloys thereof.

7. The optical recording media as claimed in claim 1, wherein a material of the reflective layer comprises gold, silver, molybdenum, aluminum, titanium, tantalum, neodymium, bismuth, or alloys thereof.

8. The optical recording media as claimed in claim 1, further comprising a dielectric layer, disposed between the first recording layer and the reflective layer.

9. The optical recording media as claimed in claim 8, wherein a material of the dielectric layer comprises zinc sulfide-silicon oxide, silicon nitride, germanium nitride, or silicon carbide.

10. The optical recording media as claimed in claim 1, further comprising a dielectric layer, disposed between the first recording layer and the cap layer.

11. The optical recording media as claimed in claim 10, wherein a material of the dielectric layer comprises zinc sulfide-silicon oxide, silicon nitride, germanium nitride, or silicon carbide.

12. The optical recording media as claimed in claim 10, further comprising a buffer layer, disposed between the dielectric layer and the cap layer.

13. The optical recording media as claimed in claim 12, wherein a material of the buffer layer comprises silicon oxynitride.

14. The optical recording media as claimed in claim 1, wherein a material of the second recording layer comprises tellurium, palladium, germanium, indium, silver, antimony, copper, a silicon mixture, or alloys thereof.

15. The optical recording media as claimed in claim 1, further comprising a dielectric layer, disposed between the second recording layer and the cap layer.

16. The optical recording media as claimed in claim 15, wherein a material of the dielectric layer comprises zinc sulfide-silicon oxide, silicon nitride, germanium nitride, or silicon carbide.

17. The optical recording media as claimed in claim 16, further comprising a buffer layer, disposed between the dielectric layer and the cap layer.

18. The optical recording media as claimed in claim 17, wherein a material of the buffer layer comprises silicon oxynitride.

\* \* \* \* \*